(12) United States Patent
Degner et al.

(10) Patent No.: US 8,987,657 B2
(45) Date of Patent: Mar. 24, 2015

(54) SPATIAL FILTER MEASURING ARRANGEMENT, DEVICE, AND ASSOCIATED METHOD HAVING A MIRROR ARRAY WITH MOVABLE MIRROR ELEMENTS FOR GENERATING A GRATING STRUCTURE

(75) Inventors: Martin Degner, Kröpelin (DE); Nils Damaschke, Bargeshagen (DE); Martin Schaeper, Rostock (DE); Ingolf Menn, Dargun (DE)

(73) Assignee: Micro-Epsilon Optronic GmbH, Dresden-Langebruck (DE)

( * ) Notice: Subject to any disclaimer, the term of this patent is extended or adjusted under 35 U.S.C. 154(b) by 277 days.

(21) Appl. No.: 13/512,103

(22) PCT Filed: Oct. 12, 2010

(86) PCT No.: PCT/EP2010/006226
§ 371 (c)(1),
(2), (4) Date: Sep. 14, 2012

(87) PCT Pub. No.: WO2011/063876
PCT Pub. Date: Jun. 3, 2011

(65) Prior Publication Data
US 2013/0001401 A1    Jan. 3, 2013

(30) Foreign Application Priority Data
Nov. 26, 2009 (DE) .......................... 10 2009 047 198

(51) Int. Cl.
*G01J 3/50* (2006.01)
*G01P 3/36* (2006.01)
*G01P 5/26* (2006.01)

(52) U.S. Cl.
CPC .... *G01P 3/36* (2013.01); *G01P 5/26* (2013.01)
USPC .......................................... 250/226; 250/221

(58) Field of Classification Search
USPC .................. 250/216, 208.1, 226, 221, 203.4; 359/199–224, 290–298; 126/600, 714, 126/571
See application file for complete search history.

(56) References Cited

U.S. PATENT DOCUMENTS

| 3,677,647 A | 7/1972 | Misek |
| 3,711,200 A | 1/1973 | Maughmer |

(Continued)

FOREIGN PATENT DOCUMENTS

| DE | 2253434 A | 5/1974 |
| DE | 195 49 074 A1 | 6/1997 |

(Continued)

OTHER PUBLICATIONS

International Preliminary Report on Patentability and Written Opinion from International Patent Application No. PCT/EP2010/006226, dated Jun. 5, 2012.
International Preliminary Report on Patentability and Written Opinion from International Patent Application No. PCT/EP2010/006226, dated Feb. 9, 2011.

*Primary Examiner* — Que T Le
(74) *Attorney, Agent, or Firm* — Alston & Bird LLP (57) ABSTRACT

The invention relates to a spatial filter measuring arrangement (1) and a spatial filter measuring device (2) comprising at least one sensor (4, 5; $41^I$-$41^{IV}$; 51) and a spatial filter, wherein electromagnetic radiation, in particular light, that is emitted or reflected by a measurement object (13), is imaged onto the sensor (4, 5; $41^I$-$41^{IV}$; 51, 52) by means of the spatial filter. The invention further relates to a method for spatial filter measurement. The spatial filter measuring arrangement according to the invention is further developed in that the spatial filter is designed as a micro-mirror array which has mirror elements (21-21''') which can be moved about respective angular positions.

27 Claims, 5 Drawing Sheets

(56) References Cited

U.S. PATENT DOCUMENTS

| | | |
|---|---|---|
| 3,902,804 A | 9/1975 | Baxter |
| 5,557,395 A | 9/1996 | Uno et al. |
| 5,596,185 A * | 1/1997 | Bross et al. ............... 250/208.1 |
| 8,122,878 B1 * | 2/2012 | Gross et al. .................. 126/600 |
| 2003/0174939 A1 | 9/2003 | Moon et al. |
| 2004/0160599 A1 | 8/2004 | Hamamatsu et al. |
| 2006/0007436 A1 | 1/2006 | Kurosawa et al. |
| 2010/0245811 A1 | 9/2010 | Yoshikawa |

FOREIGN PATENT DOCUMENTS

| | | |
|---|---|---|
| EP | 0 911 667 A1 | 4/1999 |
| EP | 1 400 780 A1 | 3/2004 |
| JP | 7120484 A | 5/1995 |
| WO | WO-2009/072484 A1 | 6/2009 |

* cited by examiner

SPATIAL FILTER MEASURING ARRANGEMENT, DEVICE, AND ASSOCIATED METHOD HAVING A MIRROR ARRAY WITH MOVABLE MIRROR ELEMENTS FOR GENERATING A GRATING STRUCTURE

BACKGROUND OF THE INVENTION

1. Field of the Invention

The invention relates to a spatial filter measuring arrangement that comprises a sensor and a spatial filter, wherein electromagnetic radiation, in particular, light that is emitted or reflected from a measure object is imaged by the spatial filter onto the sensor. The invention further relates to a spatial filter measuring device, the use of a mirror array as a spatial filter in a spatial filter measuring arrangement, and to a method for effecting spatial filter measurement.

2. Description of Related Art

The measuring technology of spatial filters is a well-established, robust, and efficient method for effecting noncontact measurement of the velocities of measuring objects, such as, for example, gases, fluids, or solid bodies. The measuring technology of spatial filters functions free of wear and reliably without any mechanical moving parts. There is no slippage nor physical wear to degrade the measurement or the apparatus. In addition to velocity measurement, accelerations, the location or position of measuring objects, or other application-specific parameters can also be measured, such as volumetric flow rate or material flow, particle sizes or particle size distributions.

A major portion of the signal processing that is associated with converting motion into a (spatial) frequency has already been implemented in the constructive design of known spatial filter measuring devices or spatial filter measuring arrangements since these constitute a hardware correlator. An excellent point source is not required in order to effect a spatial filter measurement. Image information is correlated and a motion-equivalent frequency is generated. The signal analysis provides a simple and strong reduction of data.

In simplified terms, spatial filter measuring technology is based on the principle that a moving object or a moving surface generates a periodic signal when moving past an optical grating having a, possibly periodic, structure of transparent and nontransparent grating lines, the frequency of this signal being a function both of the velocity of the object's motion, as well as of the grating parameters or grating constants of the optical grating. Incorporated in this dependent relationship are also, for example, magnification factors from optical lenses, lens systems, or other optical elements that are employed in some cases.

If the grating structure is known, and it is optionally also known what magnification factor the optical means has that is used within the optical path of a spatial filter measuring arrangement, it is possible to us the frequency of the observed signal to infer the velocity of motion for the measuring object. In the case, for example, of a linear grating with parallel grating lines, what is measured here is the velocity component of the motion that is perpendicular to the orientation of the grating lines. A velocity component that is parallel to the orientation of the grating lines does not produce any modulation of the light passing through the grating. This component is therefore not measured.

In the case of a uniform motion, a linear grating used as a spatial filter yields a frequency response with a pronounced maximum that corresponds to the motion component of the measuring object perpendicular to the orientation of the grating lines. Another frequency spectrum is optionally superimposed on this frequency maximum, which spectrum arises due to any surface roughness present on the surface of the measuring object. The spatial frequencies generated by the regularities or irregularities of the surface can be utilized as the measuring effect; however, they can also result in uncertainties or ambiguities in the interpretation of the measurement results.

There are essentially two known approaches to effecting spatial filter measurement. In a first approach, the spatial filter measurement is implemented using hardware spatial filters. These spatial filters involve discrete construction elements, such as optical gratings. The light that passes from a moving measuring object is thereby modulated over time. The modulation frequency depends, among other things, on the velocity of the measuring object and on the orientation of the optical grating, and on its grating parameter or grating constant. If magnification optics are used, the modulation frequency also increases along with the magnification factor.

The time-modulated light is detected, for example, by photodiodes that have a high cutoff frequency, such as, for example, 10 MHz or up into the GHz range. In this first approach, the fast reaction time of photodiodes enables very fast signals and very high frequencies to be processed in the spatial filter measurement—as long as sufficient light is available. To this end, the hardware, thus optionally the optics used and the spatial filters used, are adapted to the given conditions of use—for example, in terms of the velocities to the measured, of the surface properties of the measuring objects. What the adaptation achieves is to adjust the optimum modulation signals for the given conditions of use and the parameters to be measured. This is intended to avoid uncertainties or destructive resonances, for example, with the grating parameters of the spatial filter and to achieve an effective signal-to-noise ratio.

This first approach using discrete optical construction elements as the spatial grating provides very high time resolution for the measurement enabled by the possibility of using very fast receivers. Adaptation of the hardware is, however, costly. Low flexibility means that it is possible that uncertainties in the measurement results and unwanted correlations on surface parameters will sometimes not be recognized.

The second approach eliminates the need for using hardware spatial filters. Instead, spatial filter measurement is implemented by special signal processing of line-type or two-dimensional receivers, e.g., cameras using CCD or CMOS chips. In this case, no optical gratings are required; instead, the grating-like or matrix-like structuring of the optical receiver is exploited to effect the spatial filter measurement.

Spatial filter measurement here comprises producing the correlation or summation of signals from individual pixels, where computational means are used to generate a spatial filter effect. Thus different spatial filters can be applied without modifying the hardware solely based on a software-adjustable modification of the used evaluation routines. This is analogous to exchanging optical gratings based on the above-referenced approach. Spatial filter measurement using the second approach is very flexible and can be easily adapted to various conditions of use. Complex spatial filter algorithms and correction algorithms can be implemented, thereby enabling any possible uncertainties and errors to be significantly minimized.

However, the limiting speed of CCD and CMOS chips is smaller by several orders of magnitude than for photodiodes. For CCDs or CMOS sensors, this speed is approximately 10 kHz to 20 kHz. These sensors, however, do not allow for continuous measurement since the volume of image data cannot be not transmitted and processed in real-time. Due to the slow signal response of these sensors, the time resolution of the measurement is significantly more limited than with the first approach. As a result, only a fraction of the bandwidth of the spatial filter spectrum can be achieved as compared with the first approach, with the result that the second approach is cannot be used in those cases where high spatial frequencies predominate. Due to this lower time resolution, it is not possible in all cases of application to eliminate the uncertainties in the measurement signal and reach an unambiguous measurement result.

In light of these known approaches to effecting spatial filter measurement, the object of the invention is to provide a spatial filter measurement, a spatial filter measuring device, and a method for effecting spatial filter measurement that enable a reliable, precise and uncertainties-preventing spatial filter measurement to be achieved, which furthermore should be able to be flexibly adapted to different areas of application.

SUMMARY OF VARIOUS EMBODIMENTS

The object of the invention is achieved by a spatial filter measuring arrangement comprising at least one sensor and a spatial filter, wherein electromagnet radiation, in particular, light emitted or reflected from a measuring object can be imaged by the spatial filter onto the sensor, wherein the spatial filter measuring arrangement is further developed such that the spatial filter is provided in the form of a mirror array, in particular, a micromirror array, that includes movable mirror elements.

The invention is based on the fundamental idea that the use of a mirror array comprising movable mirror elements enables an adaptable or modifiable hardware-based spatial filter to be created. This measure enables the advantages of the above-described spatial filter measurement approaches to be combined—specifically, the high bandwidth as in the above-described first approach, and the flexibility of the second approach. At the same time, the limitation in terms of removing uncertainties in measurement, which limitation is inherent in both of the above-described approaches, is eliminated.

According to the invention, the term "light" is understood to refer, in particular, to visible light and to the adjacent frequency ranges of the ultraviolet and infrared spectrum. However, the spatial filter measuring arrangement according to the invention can also be applied for other frequency ranges, such as, inter alia, soft X-ray radiation, terahertz waves, or microwaves, although those mirror elements must be used that reflect the corresponding frequency ranges. The sizing of the mirror elements is also based on which wavelengths are to be used.

For the optical spectrum, the micromirror arrays that can be used as the mirror arrays are those such as the ones employed, for example, in projector equipment such as video projectors. These components from the domain of microelectromechanical systems (MEMS) offer both a high luminous intensity and also a sometimes even higher resolution than CCD or CMOS chips traditionally used in the above-described second approach. While sensor chips having higher resolutions are in fact available, the high number of pixels comes at the expense of read-out speed and display refresh rate. Mirror arrays are robust and both suitable for very high speeds, and can also be flexibly employed, adapted for online use, and are controllable. They provide switching frequencies of up to 24 kHz. Due to the requisite luminous efficiency, the measurement duration before switching of the mirror elements occurs will generally be longer, however, than the shortest possible measurement duration allowed by the maximum switching frequency.

Selection of the structure of the employed optical grating with its grating constants and additional grating parameters, and thus the selection, inter alia, of the measured direction of motion, is effected according to the invention not in the signal processing following signal acquisition but instead by adjusting the mirror elements of the mirror array. The signal processing can be effected using known means—in particular, whenever fast and non-segmented sensors are employed such as, for example, non-segmented photodiodes.

The use of mirror arrays in the optical path of the arrangement enables a freely selectable spatial filter structure to be achieved that has very high spatial resolution. The light that is weighted in this fashion is then passed onto a number of, in particular, very fast photodetectors, which number is significantly reduced in comparison with optical resolution of the system. Despite the high time resolution of the spatial filter measurement signal achievable in this way, the complexity and variability of the spatial filter are not restricted. As a result, metrological tasks can be realized such as those known from the areas of complex spatial filter measurement technology or image processing, yet the system can also be manufactured comparatively inexpensively in large production runs.

A control device is preferably provided to control the movement of the mirror elements, and/or an evaluation device is provided to evaluate signals from the at least one optical sensor. The control device and the evaluation device can also be integrated together, in particular, in a data processing unit.

The control device for controlling the movement of the mirror elements can be used, one the one hand, to flexibly adapt the mirror-array-based spatial filter to given measurement conditions. On the other hand, the control device can be used to set adjustments such that the grating structure generated by the mirror array changes over the course of measurement. For example, it is possible to switch back and forth between a vertical and horizontal line pattern, or to configure other orientations of the line patterns so as to enable measurement to be made of a motion in different directions, in particular, directions that are perpendicular to each other. As a result, different motion components are measured and the entire direction of motion is acquired.

The dynamic grating adjustment results in an increase in the system's measurement precision and resistance to interference, and in suppression of previously occurring uncertainties or ambiguities in the measurement. The arrangement provides high signal quality since the motion information is generated from a two-dimensional field, and, as a result, averaging is effected with noise and error reduction right in the hardware correlation.

The at least one sensor is preferably a photodiode, phototransistor, segmented photodiode, photodiode line, or phototransistor line, photodiode matrix, or phototransistor matrix, CCD array, or CMOS array.

Photodiodes and phototransistors, as well as segmented photodiodes, have a very high temporal dynamic range and allow for measurement at high bandwidth, including high spatial frequencies. Since they in many cases also have a relatively highly sensitive surface and high optical efficiency, they enable a fast signal to be acquired together with at the same time a low signal-to-noise ratio. Photodiodes allow measurements to be made in the MHz up to the GHz frequency range.

The combination of a mirror array as the spatial filter with segmented sensors, such as, for example, a CCD array or CMOS array, provide additional analytical capabilities, even when the read-out speed of a CCD array or CMOS array is lower than the speed obtainable with a photodiode.

At least one optical element, is preferably provided—in particular, an optical lens, lens arrangement, and/or collimator—within the optical path of the electromagnet radiation. The optical element advantageously enables good imaging performance and high luminous intensity to be achieved, with the result that this measure also enables a high signal-to-noise ratio to be achieved. The optical element can also have a magnifying or reducing function, thereby enabling the optical element to be further adapted for a corresponding measuring object.

An advantageous development of the invention consists in providing a plurality of sensors or at least one sensor having multiple segments, wherein each sensor or each sensor segment has only one section of the mirror array in its field of view, in particular, by using preceding optical elements. Each section here of the mirror array can have a different grating structure, with the result that multiple independent spatial filter measurements can be made simultaneously within the arrangement. This can be either the simultaneous measurement of different motion components of a movement or also the configuration of different grating constants or grating parameters, or totally different grating structures, including nonlinear grating structures.

The mirror elements of the mirror array can advantageously be moved in at least two different directions between respectively two fixed angular positions. For example, it is possible to move the individual mirror elements back and forth between a maximum position in one direction and a maximum position in another direction, thereby enabling incident light rays to be directed onto a sensor in one position and away from the sensor in the other position, in particular, towards another sensor. This occurs in at least two directions—for example, in a vertical direction and a horizontal direction relative to a normal on a mirror array, the mirror elements of which are arranged in horizontal and vertical rows or columns.

In an advantageous embodiment of the invention, the mirror elements of the mirror array can be moved continuously, or quasi-continuously, in at least two different directions in terms of their respective angular positions. This means that at least almost any angular position can be set within maximum limits, in other words, for example, vertically and horizontally, without increments or only with very small angular increments. This enables an optical correction or optical focus to be achieved by utilizing the mirror elements of the mirror array, or to control different sensors in different parts or sections of the mirror array.

In addition, at least two sensors are preferably provided that can be controlled by mirror elements of the mirror array, wherein one sensor receives electromagnetic radiation from a first set of mirror elements at a first angular position when one grating structure is configured by selecting or specifying angular positions of the mirror elements of the mirror array, while another sensor receives electromagnetic radiation from a second set of mirror elements at a second angular position, wherein the first set and the second set of mirror elements are selected from at least one section of the mirror array, and with reference to the at least two sensors form a positive and a negative of a grating structure relative to each other.

This preferred embodiment is analogous to an arrangement in which the spatial filter is composed of an optical grating, the grating lines of which are mirror-coated, thereby allowing light to penetrate through the spatial filter in the intermediate spaces between the grating lines, while light is reflected back from the mirror-coated grating lines. If in this case one sensor each is disposed both in front of and behind the spatial filter, the one sensor receives the negative of what the other sensor receives. In this case a difference measurement is possible, thereby achieving increased measurement precision and also further improving the signal-to-noise ratio. This is achieved here due to the fact that light is reflected at different angular positions toward different sensors.

The object of the invention is also achieved by a spatial filter measuring device that comprises a spatial filter measuring arrangement according to the invention as described above. A spatial filter measuring device of this type is portable and installable as a unit, and already includes all components required to effect spatial filter measurement.

The object of the invention is furthermore achieved by the use of a mirror array, in particular, a micromirror array, as the spatial filter within a spatial filter measuring arrangement or spatial filter measuring device.

A mirror array here is understood to refer to a mirror array comprising small mirror elements. For example, micromirror arrays are currently available for optical projectors or video projectors in which the mirror elements have an edge length of 10 μm. Micromirror arrays of this type have multiple 100,000s up to multiple millions of mirror elements. This provides a high luminous intensity, small grating constant corresponding to a high spatial frequency, as well as, optionally, a division of the micromirror array into multiple sections. Different grating structures can be generated in parallel therein in order, for example, to measure multiple motion components or other properties of a measuring object simultaneously.

This object of the invention is achieved by the use of a spatial filter measuring arrangement according to the invention or a spatial filter measuring device to measure a velocity, direction of motion, particle size, and/or surface properties of a measuring object.

Finally, the object of the invention is achieved by a method for effecting a spatial filter measurement in which electromagnetic radiation, in particular, light that is emitted or reflected from a measuring object, is imaged by a spatial filter in the form of a mirror array, in particular, a micromirror array having movable mirror elements, onto at least one sensor, wherein the spatial distribution of the angular positions of the mirror elements in the mirror array enable a spatial filter to be generated that has a grating structure. This method provides the above-described advantages.

Preferably, a regular line grating, a chirped grating with a grating structure changing in one direction, or circular grating is configured as the grating structure.

Regular line gratings are suitable for measuring the velocity of the movement of a measuring object in the direction that is perpendicular to the orientation of the grating lines of a measuring object. This signal that has a defined frequency is sometimes superimposed by a frequency spectrum that is due to the irregular surface properties of a measuring object.

What is called a chirped grating is also a line grating in which, however, the grating constant changes in a direction that is perpendicular to the orientation of the grating lines. This means that the spacing between the lines and their width increases in one direction and decreases in the opposite direction. A chirped grating of this type is used, for example, to measure the size of particles. A particle that moves at a constant velocity past a chirped grating generates a signal that can be compared with a sinusoidal curve, the time constant of which increases or decreases with time. For certain grating spacings, the particle size is destructively resonant with the grating spacing, with the result that the amplitude of the modulated signal collapses. For this reason, the particle size must be inferred from the minima of the envelope of the signal.

A circular grating is composed of sequence of concentric rings of equal or increasing or decreasing spacing in the radial direction. One possible application is the measurement of a center of a rotational motion.

In another advantageous development, the mirror array is divided up into different sections in which respectively different grating structures or gratings with different properties are configured, in particular, orientation and/or grating constant of the grating. It is thus possible to divide up the mirror array into two or more sections in which, for example, a horizontally and a vertically oriented grating is created, thereby enabling a measurement to be made simultaneously of the horizontal and vertical components of the motion of a measuring object.

It is also possible to provided multiple sections in which parallel-oriented grating structures are configured that have different grating constants, with the result that uncertainties are eliminated in the determination of the velocity of motion of the measuring object. In this case, the light that is reflected by different grating structures in the different sections of the mirror array, is preferably received respectively different sensors.

In another advantageous development or alternative development of the method according to the invention, the configured grating structure is changed during a measurement. Thus, it is possible, for example, to switch back and forth between a horizontal grating and a vertical grating in order to measure successively different motion components of the motion of the target with relatively high luminous intensity by using the entire surface of the mirror array.

To this end, provision is preferably made here whereby the orientation and/or the grating constant of the grating structure are changed and/or the grating structure is rotated over the course of the measurement. Continuous rotation of a linear grating has the effect that the direction indicator that shows in which direction the instantaneously measured motion component of the measuring object is pointing is rotated continuously, with the result that a sinusoidal frequency-modulated signal appears, for example, in response to a linear or uniform rotation in one direction.

A continuous modification of the grating constants has an effect that is analogous to a chirped grating, in particular, given an unchanging orientation or the grating lines. In this way, for example, the structure of the surface of a measuring object is efficiently evaluated in detail.

A mirror array, the mirror elements of which are movable in their angular positions continuously or quasi-continuously, is preferably used to control different sensors in different sections of the mirror array. This enables an individual mirror array and multiple sensors to be used simultaneously to effect spatial filter measurements with different grating structures, with the result that different direction of motions and/or surface structures can be measured simultaneously.

In an advantageous development, a mirror array, the mirror elements of which are movable in their angular positions continuously or quasi-continuously, is used to make optical corrections and/or to focus by adjusting the angular positions. In this way, in addition to the function of providing an optical grating, the mirror array instead of providing a focusing lens can also take on the function of the lens. It is also possible in this way to correct lens aberrations either completely or partially.

An especially high signal-to-noise ratio is advantageously achieved if at least two different sensors with mirror elements can be controlled at different angular positions, wherein the grating structure generated by the distribution of the mirror elements with reference to one sensor is the negative of the grating structure with reference to the other sensor. The two measurements that are positive and negative relative to each other can be used to effect a difference measurement in which the signal-to-noise ratio is reduced by approximately 30% due to the quantity of light being doubled.

A flexible adaptation of the method is preferably possible if grating parameters adapted to a measuring object and/or measuring target, in particular, for an optimized signal-to-noise ratio, are searched and configured automatically at the start of a measurement. In this case, the assessment of the optimization parameters, for example, the signal-to-noise ratio, is effected using known methods and algorithms, while grating parameters can be adjusted continuously until an optimum value has been found.

In cases where the motion of a measuring object is linear, this can mean that the orientation of a linearly regular grating is modified until the grating lines are positioned perpendicular to the otherwise constant direction of motion of the measuring object. This corresponds to a maximum of the spatial frequency. The grating constant can be adjusted such that it is set as far away as possible from destructive resonances of the velocity of motion at grating constants at which the frequency signal collapses.

BRIEF DESCRIPTION OF THE SEVERAL VIEWS OF THE DRAWINGS

The following discussion describes the invention in more detail, without limitation to the inventive idea, based on exemplary embodiments that reference the drawings, whereby explicit reference is made to the drawings in regard to all details that are not described in more detail in the text. Here:

FIGS. 2*a*)-2*c*) are schematic views of a control principle of a mirror array;

FIGS. 3*a*)-3*f*) depict multiple examples of grating structures that are adjustable according to the invention;

DETAILED DESCRIPTION

In the following figures, identical or analogous elements or corresponding parts are provided with the same reference numerals, and thus no corresponding repeat explanation is necessary.

Figure 1:
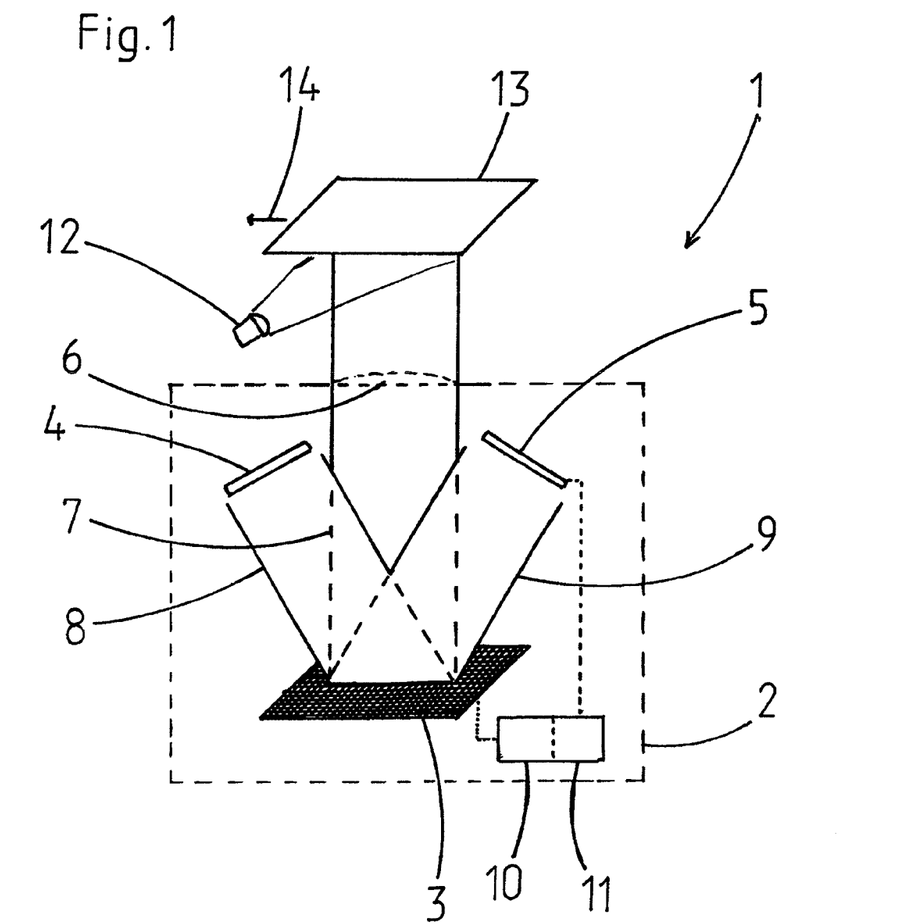
FIG. 1 is a schematic view of a spatial filter measuring arrangement according to the invention or a spatial filter measuring device according to the invention.

FIG. 1 schematically depicts a spatial filter measuring arrangement 1 or a spatial filter measuring device 2. In contrast to spatial filter measuring arrangement 1, spatial filter measuring device 2 has a housing, indicated by a broken line, that encloses the corresponding components of spatial filter measuring arrangement 1.

Spatial filter measuring arrangement 1 comprises a mirror array 3, in particular, in the form of a micromirror array 3 including mirror elements, the edge lengths of which are in the μm range, as well as two symmetrically configured photodiodes 4 and 5. Photodiodes 4 and 5 are planar, non-segmented optical sensors. Other, in particular, segmented optical sensors, such as, for example, line sensors or sensor matrices can be used in place of these non-segmented sensors.

Spatial filter measuring arrangement 1 furthermore comprises a control device 10 and an evaluation device 11 which, shown schematically, can also be implemented in a combined device, for example, a data processing unit. In the case of very fast signals from photodiodes 4 and 5, however, the evaluation device can also be hardware-based for reasons of speed, while control device 10 can be implemented in software. The broken lines indicating signal wires show that control device 10 controls the position of the mirror elements of mirror array 3, while evaluation device 11 receives signals from photodiode 5, and from photodiode 4 that for reasons of clarity is not shown.

Spatial filter measuring arrangement 1 receives light that emanates from the moving object surface 13 of a measuring object. This is illustrated in FIG. 1 in such a way that the light emanates from light source 12 and is reflected by moving object surface 13. The direction of motion of the moving object is indicated by an arrow 14. The light reflected from object surface 13, optionally passing through an optical element 6 of spatial filter measuring arrangement 1, hits mirror array 3 or a mirror matrix, from where, depending on the angular position of the mirror elements of mirror array 3, the light is deflected or reflected towards photodiode 4 or towards photodiode 5.

The central optical path is identified by reference numeral 7; the reflected optical paths 8 an 9 constitute the continuation of optical path 7 after reflection from mirror array 3 to photodiodes 4 or 5. Optical path 7 is preferably already a parallel optical path. Optical element 6 can therefore be a lens system that generates a parallel optical path, or a collimator, or a series of collimators. This can also involve a telecentric optical means that allows a considerable amount of light to pass through, while only axially parallel beams from the object penetrate into spatial filter measuring arrangement 1. A telecentric optical means also has an advantageously large depth of focus.

The arrangement depicted in FIG. 1 enables a difference measurement to be made that has a relatively high signal-to-noise ratio since the light falling from object surface 13 onto mirror array 3 is directed completely onto photodiodes 4 and 5, and the signal that arrives at photodiode 4 is the negative of the signal that arrives at photodiode 5.

Figure 2:
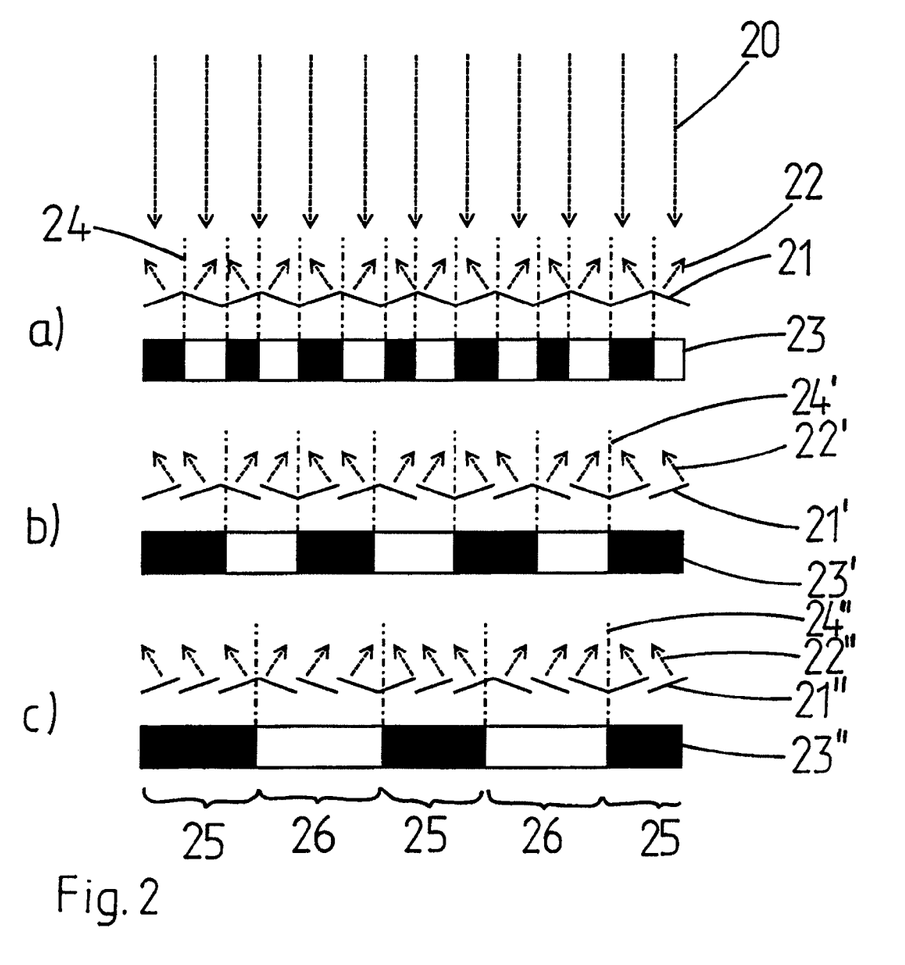

FIG. 2 is a schematic sectional view through mirror array 3 that illustrates the functional principle of mirror array 3 as a spatial filter used in a simple application. Figure sections a), b), and c) depict three examples, each having greater grating periods. A parallel light beam 20 come in from above that hits the respective mirrors 21, 21', and 21" in FIG. 2*a*), 2*b*), or 2*c*). Mirror elements 21, 21', and 21" each assume an oblique position such that they again reflect the incident light coming from above either up to the left or up to the right. The directions of reflection are identified by reference numerals 22, 22', and 22".

FIG. 2*a* illustrates the situation in which each of two adjacent mirror elements 21 occupy respectively different positions. As a result, each individual mirror element 21 creates a zone of the grating that is alternately dark or light, for example, for photodiode 5 of FIG. 1, as is shown by the bars indicated by reference numeral 23. The dash-dotted lines 24 indicate the zonal boundaries that coincide with the ends or edges of mirror elements 21, 21', and 21". FIG. 2*a*) thus shows the smallest attainable grating constant or smallest attainable grating parameter that is determined by the periodicity of the mirror elements of mirror array 3.

FIG. 2*b*) illustrates a situation with a doubled grating constant since respective pairs of two adjacent mirror elements 21' are oriented in the same direction 22' and differ therein from the adjacent double pair of mirror elements 21'. Zones 23' of the grating structure are thus double the width of zones 23 that are shown in FIG. 2*a*).

The grating constant or grating parameter in FIG. 2*c*) is enlarged by an additional mirror element width. Zones 23" are thus three times as wide as zones 23' in FIG. 2*a*). What is also illustrated below FIG. 2*c*) is that respective left-tilted mirror elements 21" from multiple zones constitute a set 25 of mirror elements that all reflect incident light 20 from above in one direction, i.e., towards one sensor, while right-tilted mirror elements 21" from the remaining zones constitute a second set 26 of mirror elements 21" that reflect incident light 20 in the other direction, i.e., away from the first sensor, and optionally towards a second sensor.

Figure 3:
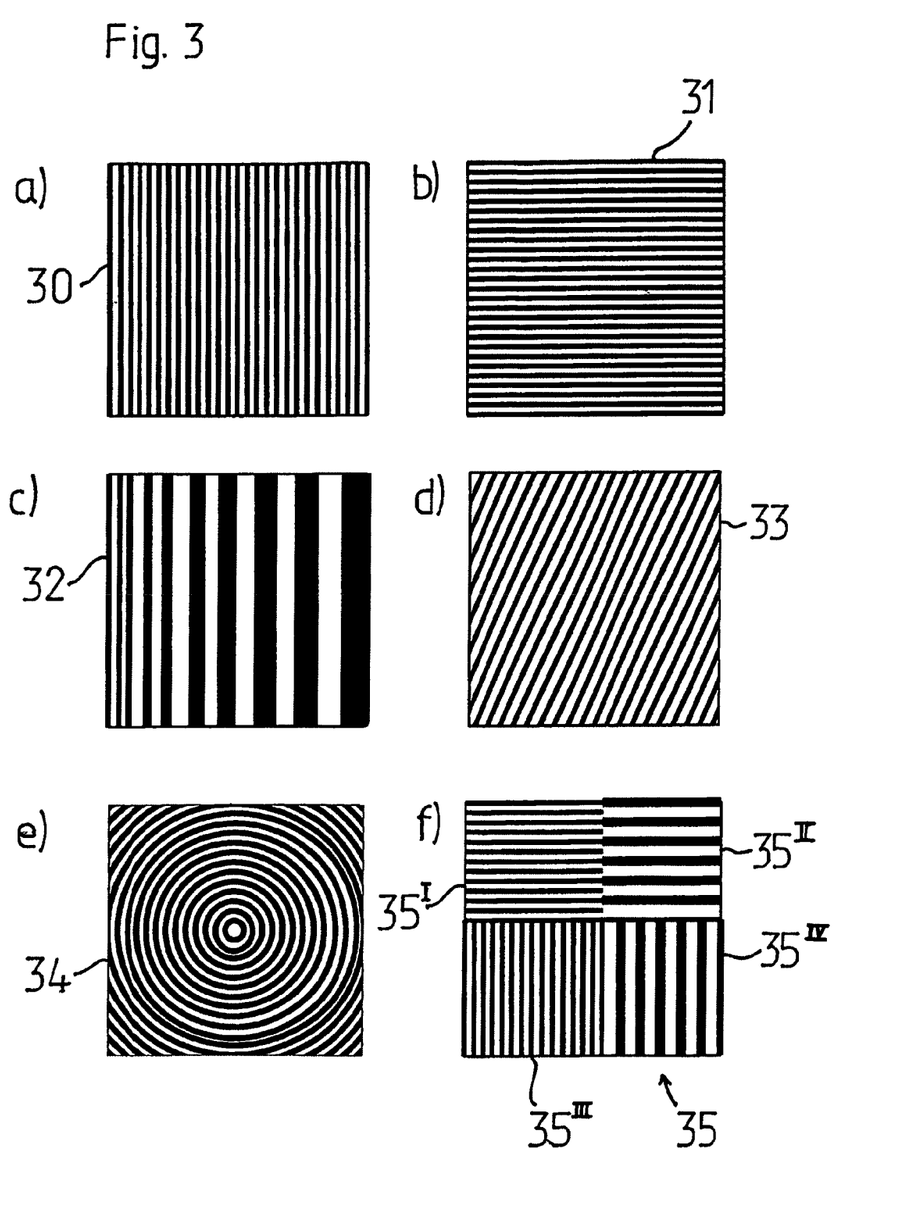

FIG. 3 schematically illustrates multiple different grating structures. For example, a regular line grating 30 with vertical grating lines is depicted in FIG. 3*a*). A spatial filter measurement using grating structure 30 produces a measurement of a motion component in the horizontal direction. FIG. 3*b*) illustrates the reverse situation for a regular line grating 31 with horizontal grating lines that results in a measurement of a vertical motion component.

FIG. 3*c*) illustrates a so-called chirped grating 32 that has vertical grating lines, the spacing and width of which increase from left to right. A chirped grating 32 of this type functions, for example, to measure the size of moving particles.

FIG. 3*d*) illustrates a linear grating 33 that has obliquely oriented grating lines. Grating 33 can also be an instantaneous snapshot of a continuously rotating linear grating that represents a transitional form of gratings 30 and 31 in FIG. 3*a*) and FIG. 3*b*).

FIG. 3*e*) illustrates a circular grating 34 that has a constant grating parameter. This circular grating 34 can be used, for example, to determine a center of rotation of a rotational motion.

FIG. 3*f*) illustrates an assembled grating structure 35 that has four sections $35^I$ to $35^{IV}$. Sections $35^I$ and $35^{II}$ have regular line gratings with horizontal grating lines and different grating parameters, while sections $35^{III}$ and $35^{IV}$ also have regular line gratings with vertical grating lines having different grating parameters. This selection of the grating parameters allows uncertainties to be avoided when determining the velocity in different motion components.

It is also possible to provide additional independent grating structures in individual sections of grating structure 35, for example, circular grating 34, chirped grating 32, or a grating that is composed of a line grating, the orientation and/or the parameters of which change continuously. In this way, different measurements are possible simultaneously by using single mirror array 35 due to the configuration of sections $35^I$ through $35^{IV}$ with different grating structures. The number and arrangement of different sections is selected and illustrated here only by way of example. It is also possible to select more or fewer sections in the various arrangements.

Figure 4:
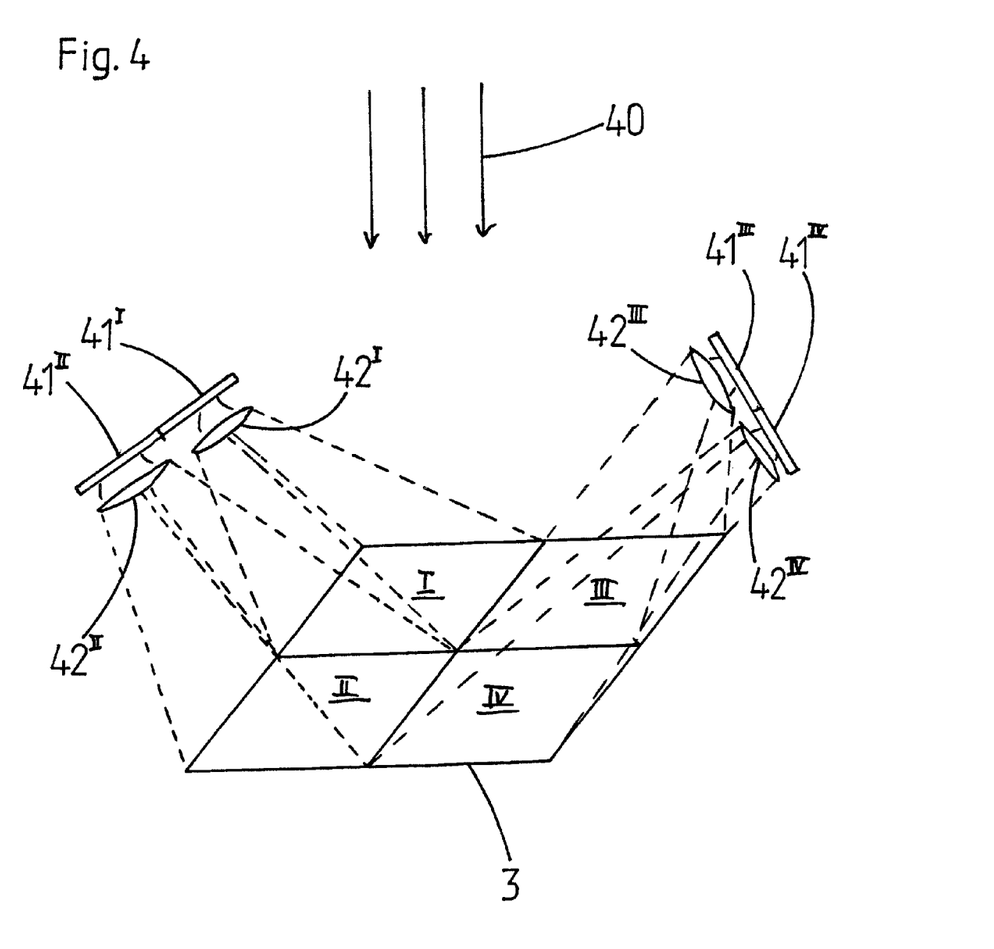
FIG. 4 is a schematic view of a first arrangement that uses a mirror array comprising multiple sections.

FIG. 4 schematically illustrates a variant according to the invention of a spatial filter measuring arrangement using mirror array 3 that has multiple sections I through IV. Illustrated are four photodiodes $41^I$ through $41^{IV}$ that are each oriented towards mirror array 3. A separate optical means $42^I$ through $42^{IV}$ is associated with each individual photodiode $41^I$ through $41^{IV}$, the focusing properties of this optical means being such that each of sensors $41^I$ through $41^{IV}$ has only one sector I-IV of mirror array 35 in view. This enables four simultaneous and mutually independent measurements to be obtained.

FIG. 4 illustrates how an incident light beam 40 hits mirror array 3 and is reflected from there to sensors $42^I$ through $42^{IV}$. The sensors are arranged in two groups—specifically, two sensors $41^I$ and $41^{II}$ on one side, and $41^{III}$ and $41^{IV}$ on the opposite side. In this arrangement, it is sufficient if the mirror elements of mirror array 3 over the entire area of mirror element 3 as a whole are oriented towards either the two sensors $41^I$ and $41^{II}$, on one side, and in another angular position towards sensors $41^{III}$ and $41^{IV}$. No quasi-continuous adjustment of the angular positions of the mirror elements is required. The selection is effected by preceding optical means $42^I$ through $42^{IV}$ of the sensors.

Figure 5:
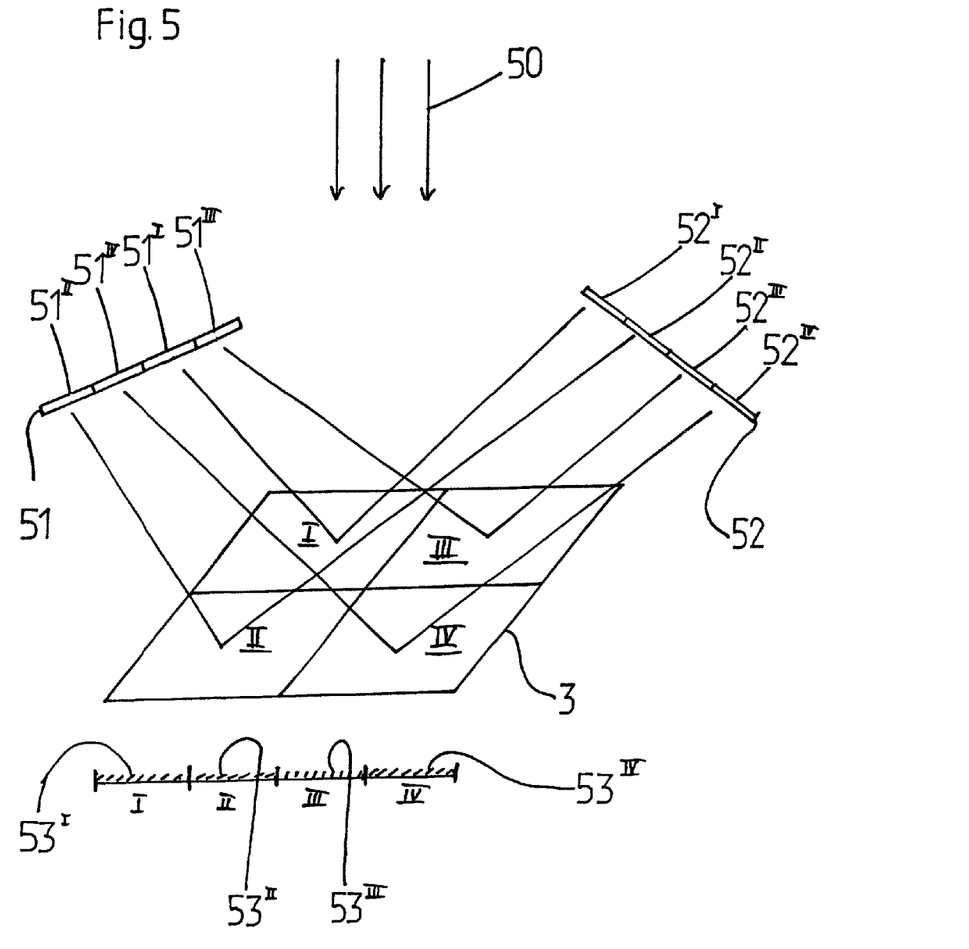
FIG. 5 is a schematic view of another arrangement that uses a micromirror array comprising different sections.

FIG. 5 illustrates an alternative version relative to FIG. 4. Accordingly, a parallel light beam 50 in FIG. 5 emanating from a measuring object hits micromirror array 3 that is subdivided into four sections I through IV in which different grating patterns or grating structures are generated. Segmented sensors 51 and 52 are disposed on both sides of incident light beam 50, each of the sensors including segments $51^I$ through $51^{IV}$ and $52^I$ through $52^{IV}$.

The mirror elements of mirror array 3 in this case are adjustable in such a way that in different sections the surfaces of segments $51^I$ through $51^{IV}$, on the one side, and $52^I$ through $52^{IV}$ can be aimed at in targeted fashion. To this end, the angular setting of the mirror elements can advantageously be adjusted individually and continuously or quasi-continuously. In this embodiment, the different segments of segmented sensors 51 and 52 receive complementary signals, meaning, for example, the signal on segment $52^I$ is the negative of the signal on segment $51^I$.

In the lower portion of FIG. 5, a series of mirror elements in sections I-IV is schematically illustrated in cross-section. It is evident here that with the respective same orientation of the mirror elements in one section the actual angular orientation $53^I$ to $53^{IV}$ differs in individual sections I through IV in order to control the corresponding segments of sensors 51 and 52.

The invention claimed is:

1. A spatial filter measuring arrangement comprising:
at least one sensor and a spatial filter, wherein electromagnetic radiation that is emitted or reflected from a measuring object moved past the spatial filter is imaged by the spatial filter onto the sensor, wherein a time-modulation of the electromagnetic radiation is detected for measuring one or more characteristics of the moving measuring object, wherein the spatial filter is provided in the form of a mirror array, and wherein said mirror array includes movable mirror elements for generating a grating structure.

2. The spatial filter measuring arrangement according to claim 1, wherein a control device is provided to control the movement of the mirror elements, and/or an evaluation device is provided to evaluate signals from the at least one sensor.

3. The spatial filter measuring arrangement according to claim 1, wherein the at least one sensor is a photodiode, phototransistor, segmented photodiode, photodiode line or phototransistor line, photodiode matrix or phototransistor matrix, CCD array, or CMOS array.

4. The spatial filter measuring arrangement according to claim 1, wherein at least one optical element is provided, in particular, an optical lens, lens arrangement, and/or collimator, in an optical path of the electromagnetic radiation.

5. The spatial filter measuring arrangement according to claim 1, wherein a plurality of sensors or at least one sensor comprising multiple segments is provided, wherein each sensor or each sensor segment, has only one section of the mirror array in its field of view.

6. The spatial filter measuring arrangement according to claim 1, wherein the mirror elements of the mirror array can be moved between respectively at least two fixed angular positions in at least two different directions.

7. The spatial filter measuring arrangement according to claim 1, wherein the mirror elements of the mirror array can be moved continuously or quasi-continuously in their respective angular positions in at least two different directions.

8. The spatial filter measuring arrangement according to claim 1, wherein at least two sensors are provided that can be controlled by mirror elements of the mirror array, wherein one sensor receives electromagnetic radiation from a first set of mirror elements at a first angular position when one grating structure is configured by selecting or specifying angular positions of the mirror elements of the mirror array, while another sensor receives electromagnetic radiation from a second set of mirror elements at a second angular position, wherein the first set and the second set of mirror elements are selected from at least one section of the mirror array, and with reference to the at least two sensors form a positive and a negative of a grating structure relative to each other.

9. A spatial filter measuring device, comprising a spatial filter measuring arrangement which comprises at least one sensor and a spatial filter, wherein electromagnetic radiation that is emitted or reflected from a measuring object moved past the spatial filter is imaged by the spatial filter onto the sensor, wherein a time-modulation of the electromagnetic radiation is detected for measuring one or more characteristics of the moving measuring object, wherein the spatial filter is provided in the form of a mirror array, and wherein said mirror array includes movable mirror elements for generating a grating structure.

10. A method for effecting spatial filter measurement in which electromagnetic radiation that is emitted or reflected from a measuring object moved past the spatial filter is imaged onto at least one sensor by the spatial filter provided in the form of a mirror array having movable mirror elements, wherein a time-modulation of the electromagnetic radiation is detected for measuring one or more characteristics of the moving measuring object, wherein the spatial filter with a grating structure is generated by the spatial distribution of the angular positions of the mirror elements of the mirror array.

11. The method according to claim 10, wherein the grating structure used is a regular line grating, a chirped grating having a grating constant that changes in one direction, or a circular grating.

12. The method according to claim 10, wherein the mirror array can be divided up into different sections in which respectively different grating structures, or gratings having different properties, in particular, orientation and/or grating constant of the grating, are configured.

13. The method according to claim 10, wherein the configured grating structure is changed during a measurement.

14. The method according to claim 13, wherein the orientation and the grating constant of the grating structure is changed, and the grating structure is rotated over the course of a measurement.

15. The method according to claim 10, wherein the mirror array, the mirror elements of which can be moved in their angular positions continuously or quasi-continuously, is used to control different sensors in different sections of the mirror array.

16. The method according to claim 10, wherein the mirror array, the mirror elements of which can be moved in their angular positions continuously or quasi-continuously, is used to effect optical corrections and/or to focus by adjusting the angular positions.

17. The method according to claim 10, wherein at least two different sensors are controlled with mirror elements in different angular positions, wherein the grating structure generated by the distribution of the mirror elements with reference to one sensor is the negative of the grating structure with reference to the other sensor.

18. The method according to claim 10, where grating parameters adapted to a measuring object and/or measuring target, in particular, for an optimized signal-to-noise ratio, are searched and configured automatically at a start of a measurement.

19. The method according to claim 13, wherein the orientation and the grating constant of the grating structure are changed, or the grating structure is rotated over the course of a measurement.

20. The method according to claim 13, wherein the orientation or the grating constant of the grating structure is changed, and the grating structure is rotated over the course of a measurement.

21. The method according to claim 13, wherein the orientation or the grating constant of the grating structure is changed, or the grating structure is rotated over the course of a measurement.

22. The spatial filter measuring arrangement of claim 1, wherein the electromagnetic radiation is light.

23. The spatial filter measuring arrangement of claim 1, wherein the mirror array is a micromirror array.

24. The spatial filter measuring device of claim 9, wherein the electromagnetic radiation is light.

25. The spatial filter measuring device of claim 9, wherein the mirror array is a micromirror array.

26. The method for effecting spatial filter measurement of claim 10, wherein the electromagnetic radiation is light.

27. The method for effecting spatial filter measurement of claim 10, wherein the mirror array is a micromirror array.

* * * * *